(12) United States Patent
Kakiuchi et al.

(10) Patent No.: US 7,214,263 B2
(45) Date of Patent: May 8, 2007

(54) CARBON BLACK AND RECORDING LIQUID USING THE SAME

(75) Inventors: Munetaka Kakiuchi, Mie (JP); Shinichi Kanamaru, Kagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 11/389,043

(22) Filed: Mar. 27, 2006

(65) Prior Publication Data

US 2006/0234057 A1 Oct. 19, 2006

Related U.S. Application Data

(63) Continuation of application No. PCT/JP04/13576, filed on Sep. 10, 2004.

(30) Foreign Application Priority Data

Sep. 26, 2003 (JP) .................... P. 2003-335965

(51) Int. Cl.
- *C09C 1/48* (2006.01)
- *C09D 11/00* (2006.01)
- *B05D 7/24* (2006.01)
- *B41M 5/00* (2006.01)

(52) U.S. Cl. .................. 106/472; 106/31.9; 427/288

(58) Field of Classification Search ............ 106/31.9, 106/472; 427/288
See application file for complete search history.

(56) References Cited

U.S. PATENT DOCUMENTS 3,973,983 A * 8/1976 Jordan et al. ............... 106/472
4,035,336 A * 7/1977 Jordan et al. ............... 524/495
6,197,870 B1 * 3/2001 Sakakibara ................. 524/496
6,227,772 B1 * 5/2001 Heinloth et al. ............ 407/113
6,787,595 B1 * 9/2004 Yamada et al. ............. 524/495
2003/0219373 A1 * 11/2003 Foster ....................... 423/449.1

FOREIGN PATENT DOCUMENTS

| JP | 2001-81355 | | 3/2001 |
|---|---|---|---|
| JP | 2001-181534 | | 7/2001 |
| JP | 2001-294776 | | 10/2001 |
| JP | 2003-96333 | | 4/2003 |
| JP | 2003-96333 A | * | 4/2003 |
| JP | 2004-224955 A | * | 8/2004 |

OTHER PUBLICATIONS

Partial translation of JP2001-81355 (Mar. 2001).*
Partial translation of JP2001-181534 (Jul. 2001).*
Partial translation of JP2001-294776 (Oct. 2001).*
Partial translation of JP2003-96333 (Apr. 2003).*

* cited by examiner

*Primary Examiner*—Anthony J. Green
(74) *Attorney, Agent, or Firm*—Oblon, Spivak, McClelland, Maier & Neustadt, P.C.

(57) ABSTRACT

A recording liquid which gives a printed matter having a high blackness, reduced blurring, satisfactory printed-image quality, and satisfactory print fastness of a record such as light resistance and water resistance, and which has a low viscosity, satisfactory suitability for ejection, and excellent storage stability is provided. A carbon black has the following features (a) to (c): (a) to have a 24M4 DBP absorption of 100 cm$^3$/100 g or higher, (b) to have a $D_{75}$ larger than 45 nm and smaller than 120 nm, and (c) to have a TINT exceeding 110%. The recording liquid contains the carbon black.

14 Claims, 4 Drawing Sheets

CARBON BLACK AND RECORDING LIQUID USING THE SAME

TECHNICAL FIELD

The present invention relates to a carbon black. More particularly, the invention relates to a carbon black usable as a pigment to be contained in pigment dispersion type recording liquids for use as recording liquids for ink-jet printers or the like, and to a recording liquid.

BACKGROUND ART

Aqueous recording liquids (hereinafter often referred to simply as "recording liquids") containing a water-soluble dye as a colorant have been used as recording liquids to be mounted in ink-jet printers, in which a recording liquid is ejected as minute droplets from a thin nozzle to a recording paper to record an image, or in other printers. However, water-soluble dyes have had a drawback that when the recording liquids are printed on materials to be recorded, e.g., recording papers, the printed image has insufficient water resistance. There also has been a problem that the printed matters deteriorate due to the alteration of the dyes by light (problem concerning light resistance). In order to eliminate such problems, investigations have been made on recording liquids containing as a colorant a pigment excellent in water resistance and light resistance. For example, with respect to black recording liquids, carbon blacks have been investigated as pigments therefor.

In order for a carbon black to be used in a recording liquid for ink-jet printers or the like, the carbon black should be dispersed in water. However, carbon blacks in themselves are difficult to disperse in water or undergo or cause aggregation, sedimentation, and/or gelation after dispersion. It is therefore necessary to physically adsorb a compound having surface activity onto the surface of a carbon black or to chemically treat the surface of a carbon black to sufficiently hydrophilize the surface of the carbon black.

On the other hand, in order for such an aqueous recording liquid to give a clear printed matter having a high blackness, it is important that after the recording liquid is ejected onto a material to be recorded, the water and other ingredients constituting the dispersion medium should be rapidly absorbed into the material to be recorded itself or into the absorbing layer of the material to be recorded, as different from the case of ordinary printing inks containing a polymer resin or the like as the main component. This is because in case where the dispersion medium of the recording liquid remains on the surface of the material to be recorded for a long time, a prolonged drying time is necessary and this may result in blurring or in fouling by contact with printed areas. Consequently, for reducing the drying time, it is necessary to facilitate the separation of the carbon black from the dispersion medium of the recording liquid on the surface of the material to be recorded.

Furthermore, the aqueous recording liquid is required to have a sufficiently low viscosity so as to be prevented from clogging the thin nozzle of a printer when ejected therefrom and be easily ejected from the nozzle. In addition, the recording liquid is required to be prevented from suffering carbon black sedimentation or the like during the storage of the recording liquid. It is therefore necessary that the particle diameters of the carbon black dispersed in the recording liquid, i.e., the particle diameter of primary aggregates (structures) each made up of primary carbon black particles gathered together and that of secondary aggregates each made up of such primary aggregates gathered together, should be sufficiently small and that the amount of the carbon black contained in the recording liquid should be minimized.

However, the recording liquid is further required to have the following property. After the recording liquid is printed on a porous material to be recorded, e.g., paper, carbon black infiltration into the material to be recorded is diminished so that the amount of carbon black particles remaining on the surface of the material to be recorded becomes as large as possible to thereby give a printed matter having a high black color density. For attaining this, it is necessary to use a carbon black having a large particle diameter as compared with the surface pores of the material to be recorded. It is also known that to increase the carbon black content in a recording liquid and to increase the viscosity of a recording liquid are effective.

As described above, in the recording liquids, the attainment of satisfactory storage stability or suitability for ejection from a printer or the like and the formation of a clear print having high blackness on a material to be recorded are antinomic subjects. There has been a problem that print quality such as blackness should be sacrificed because an improvement in the suitability for ejection of a recording liquid currently has priority for the purpose of, e.g., diminishing troubles in apparatus such as printers.

Under these circumstances, use of a carbon black having a large structure diameter is being investigated in order to improve the blackness of printed matters.

For example, the following have been proposed as ink-jet recording liquids attaining a high print color density: a recording liquid containing a carbon black which has a primary-particle diameter (D) of 25–120 nm, DBP absorption (B) of 40–180 cm$^3$/100 g, and pH of 2–6 and in which the particle diameter (D) and the DBP absorption (B) satisfy the relationship $10D+B \geqq 400$ (see patent document 1); a recording liquid containing a carbon black having a DBP absorption of 140 cm$^3$/100 g or higher and a volatile content of 4% by weight or lower (see patent document 2); and a recording liquid containing a carbon black having a DBP absorption of 140 cm$^3$/100 g or higher and a pH of 6 or higher and a water-soluble high-molecular compound having an acid value of 250 mgKOH/g or higher (see patent document 3).

In general, a carbon black having a large aggregate diameter tends to come to have a widened aggregate diameter distribution or an increased proportion of carbon black aggregates having a large diameter in the course of structure growth in a production step, although these tendencies depend on the production process used. Consequently, when such a carbon black having a large aggregate diameter is used as a black pigment for a recording liquid, there are cases where ink-jet nozzle clogging occurs. Because of this, use of a carbon black having a narrow aggregate particle diameter is also being investigated.

For example, the following have been proposed as recording liquids giving a printed matter having a high blackness (having a high print color density): a recording liquid containing a carbon black having a $D_{1/2}/D_{mod}$ of 0.53 or lower (see patent document 4); and a recording liquid containing a carbon black having a small particle diameter, small aggregate diameter, and narrow aggregate diameter distribution (a carbon black having an $N_2$ SA of 200 m$^2$/g or larger, $D_{mod}$ of 80 nm or smaller, $D_{1/2}/D_{mod}$ ratio of 0.6 or lower, and pH of 5 or higher) as a carbon black having satisfactory dispersibility (see patent document 5).

Furthermore, use of a carbon black having a low volatile content and reduced in the amount of surface functional groups is also being investigated in order to improve the dispersibility of a carbon black in a recording liquid. For example, recording liquids have been proposed which employ a neutral carbon black and an alkaline carbon black and are thereby satisfactory in storability and suitability for ejection (see patent documents 6 and 7).

[Patent Document 1] JP-A-7-316480
[Patent Document 2] JP-A-10-17808
[Patent Document 3] JP-A-2000-290554
[Patent Document 4] JP-A-10-168371
[Patent Document 5] JP-A-11-335583
[Patent Document 6] JP-A-10-81842
[Patent Document 7] JP-A-10-17808

DISCLOSURE OF THE INVENTION

However, the recording liquid described in patent document 1 has had a problem that since the carbon black employed has a large primary-particle diameter and a high DBP absorption, the recording liquid cannot have a small dispersed-particle diameter and causes clogging in ink-jet printers having a reduced nozzle size. Furthermore, the recording liquids described in patent documents 2 to 7 have a problem that the carbon blacks employed have an insufficient DBP absorption and the recording liquids are still insufficient in the blackness of printed matters obtained. There has been a desire for a recording liquid which not only has suitability for ejection and storage stability but also gives a clear printed matter having a high blackness and inhibited from suffering blurring, etc.

The present inventors hence made intensive investigations on the use of carbon blacks as a pigment in recording liquids, in particular, aqueous recording liquids of the type containing a pigment dispersed in a dispersion medium such as water, in order to eliminate the problems described above. As a result, they have unexpected found that when a carbon black has an aggregate diameter distribution in which the value of $D_{75}$, which indicates the proportion of aggregates having a large diameter, is within a specific range, then this carbon black, even through high in 24M4 DBP absorption, gives a recording liquid which retains satisfactory suitability for ejection over long. Furthermore, it has been found that when such a carbon black is one in which the value of the property indicating the blackness of the carbon black itself (TINT) is not lower than a specific level, then the printed matter obtained therewith has a higher blackness than the printed matters formed with recording liquids heretofore in use. The invention has been thus completed.

Namely, an essential point of the invention resides in a carbon black having the following features (a) to (c):
(a) to have a 24M4 DBP absorption of 100 cm$^3$/100 g or higher,
(b) to have a $D_{75}$ larger than 45 nm and smaller than 120 nm, and
(c) to have a TINT exceeding 110%.

BRIEF DESCRIPTION OF THE DRAWINGS

In the figures, numeral 10 denotes a carbon black production apparatus, 11 a first reaction zone, 12 a second reaction zone, 13 a third reaction zone, 14 a combustion nozzle, 15 a combustion chamber, 16 an introduction part, 17 a refractory for high temperatures, 18 a general refractory, 19 an iron shell, 20 a choke part, 21 a nozzle, 22 a cooling chamber, 23 a nozzle, 24 an outlet, and 25 an inlet.

BEST MODE FOR CARRYING OUT THE INVENTION

The carbon black of the invention has the following features (a) to (c):
(a) to have a 24M4 DBP absorption of 100 cm$^3$/100 g or higher,
(b) to have a $D_{75}$ larger than 45 nm and smaller than 120 nm, and
(c) to have a TINT exceeding 110%.

[24M4 DBP Absorption, etc.]

In carbon black aggregates, the degree of aggregate growth in a state in which parts which are easy to break have been broken is represented by 24M4 DBP absorption. In case where a recording liquid employing a carbon black having too low a value of this DBP absorption is printed on a material to be recorded, the carbon black in the printed areas has a reduced average dispersed-particle diameter and, as a result, the amount of carbon black particles remaining on the material to be recorded, e.g., paper, is reduced and the printed areas have a reduced blackness. Consequently, the 24M4 DBP absorption of the carbon black of the invention is 100 cm$^3$/100 g or higher, and is especially preferably 105 cm$^3$/100 g or higher. Conversely, in case where the value of this DBP absorption is excessively high, the average dispersed-particle diameter becomes excessively large and there are cases where the recording liquid is not smoothly ejected, for example, when the recording liquid ejection nozzle has a small diameter. Consequently, it is generally preferred that the 24M4 DBP absorption of the carbon black be lower than 130 cm$^3$/100 g.

The carbon black of the invention has any desired value of DBP absorption. However, too low values of DBP absorption may result in cases where when the carbon black is dispersed in a dispersion medium, e.g., water, in producing a recording liquid, small dispersed particles are difficult to obtain. Conversely, too high values thereof may result in cases where it is difficult to disperse the carbon black because carbon black aggregates excessively absorb the dispersion medium and coagulate. Consequently, the DBP absorption of the carbon black to be used in the invention is preferably higher than 130 cm$^3$/100 g, in particular higher than 180 cm$^3$/100 g, and is preferably lower than 250 cm$^3$/100 g, in particular lower than 210 cm$^3$/100 g.

Furthermore, in the carbon black of the invention, it is preferred that the difference between the DBP absorption and 24M4 DBP absorption described above [(DBP absorption)−(24M4 DBP absorption)] be not smaller than a given value. This difference indicates the tendency of aggregates to break when dispersed in a dispersion medium. When the value of this difference is too small, there are cases where difficulties are encountered in the dispersion operation. Consequently, in the carbon black of the invention, the value of (DBP absorption)–(24M4 DBP absorption) is preferably 40 cm³/100 g or larger, in particular 50 cm³/100 g or larger. In the invention, the values of DBP absorption and 24M4 DBP absorption were determined in accordance with JIS K6217 and the unit thereof is cm³/100 g.

[$D_{75}$, $D_{mod}$, $D_{1/2}$, and $D_{1/2}/D_{mod}$]

The carbon black of the invention has the following properties. When the carbon black has an aggregate diameter distribution in which the value of $D_{75}$, which indicates the proportion of aggregates having a large diameter, is within a specific range, then this carbon black, even through high in the 24M4 DBP absorption described above, gives a recoding liquid which retains satisfactory suitability for ejection over long. $D_{75}$ indicates 75%-volume diameter ($D_{75}$). The larger the value of $D_{75}$, the larger the proportion of large aggregates in the aggregate distribution. In case where a carbon black having too small a value of $D_{75}$ is used, the proportion of large dispersed particles in the dispersed particles present in the recording liquid is low. Use of this recording liquid results in an insufficient amount of carbon black particles remaining on a material to be recorded, e.g., paper, to give a printed matter having a reduced blackness. Conversely, too large values of $D_{75}$ result in a recording liquid in which the proportion of large dispersed particles in the dispersed particles present in the recording liquid is excessively high, and there are cases where printer nozzle clogging occurs during printing. Consequently, the $D_{75}$ of the carbon black of the invention is larger than 45 nm and is in particular 50 nm or larger, preferably 60 nm or larger, especially 70 nm or larger. Furthermore, the $D_{75}$ thereof is smaller than 120 nm and is preferably 110 nm or smaller.

The carbon black of the invention preferably is one in which the maximum-frequency Stokes equivalent diameter ($D_{mod}$) of the aggregates is within a specific range. Too small values of this diameter result in a recording liquid in which the carbon black has too small an average dispersed-particle diameter. There are hence cases where the carbon black present in the recording liquid is less apt to remain on the material to be recorded, e.g., paper, in printing to give a printed matter having a reduced blackness. Conversely, too large values of this diameter result in a recording liquid in which the carbon black has an excessively large average dispersed-particle diameter and there are hence cases where printer nozzle clogging occurs during printing. Consequently, the $D_{mod}$ of the carbon black of the invention is preferably larger than 45 nm, in particular 50 nm or larger, especially 55 nm or larger, and is preferably smaller than 120 nm, in particular 90 nm or smaller.

The carbon black of the invention preferably is one in which the Stokes-equivalent-diameter half-value width ($D_{1/2}$), which is an index to the extent of the aggregate diameter distribution, is in a specific range. The value of $D_{1/2}$ is preferably larger than 20 nm, in particular 35 nm or larger, especially 40 mm or larger, and is preferably smaller than 100 nm, in particular 80 nm or smaller, especially 60 nm or smaller. Furthermore, larger values of $D_{mod}$, which indicates a typical size of aggregates, generally tend to result in larger values of $D_{1/2}$. Because of this, it is more preferred in the carbon black of the invention that the ratio of $D_{1/2}$ to $D_{mod}$ ($D_{1/2}/D_{mod}$), which is an index to the intrinsic distribution of aggregate diameters, be within a specific range. When this ratio is too low, there are cases where the amount of carbon black particles remaining on a material to be recorded is reduced to give a printed matter having a reduced blackness. Conversely, when the value of this ratio is too large, there are cases where printer nozzle clogging occurs.

Consequently, the value of $D_{1/2}/D_{mod}$ of the carbon black to be used in the invention is preferably larger than 0.53, in particular 0.6 or larger, and is preferably smaller than 1, in particular 0.7 or smaller.

Furthermore, the carbon black of the invention preferably is one in which the ratio of 24M4 DBP absorption to $D_{mod}$ (24M4 DBP absorption/$D_{mod}$), which is an index to the density of aggregates, is in a specific range. Large values of this ratio mean that the dispersed particles have a large proportion of spaces therein and have a low density. In case where the value of that ratio is too small, the dispersed particles are apt to sediment and the recording liquid has poor storage stability. Conversely, too large values of the ratio result in an increased viscosity due to an increase in apparent volume fraction. Consequently, the carbon black of the invention is one in which the value of 24M4 DBP absorption/$D_{mod}$ is preferably larger than 1.0, in particular 1.4 or larger, and is preferably smaller than 3, in particular 2.5 or smaller, especially 2 or smaller.

Figure 2:
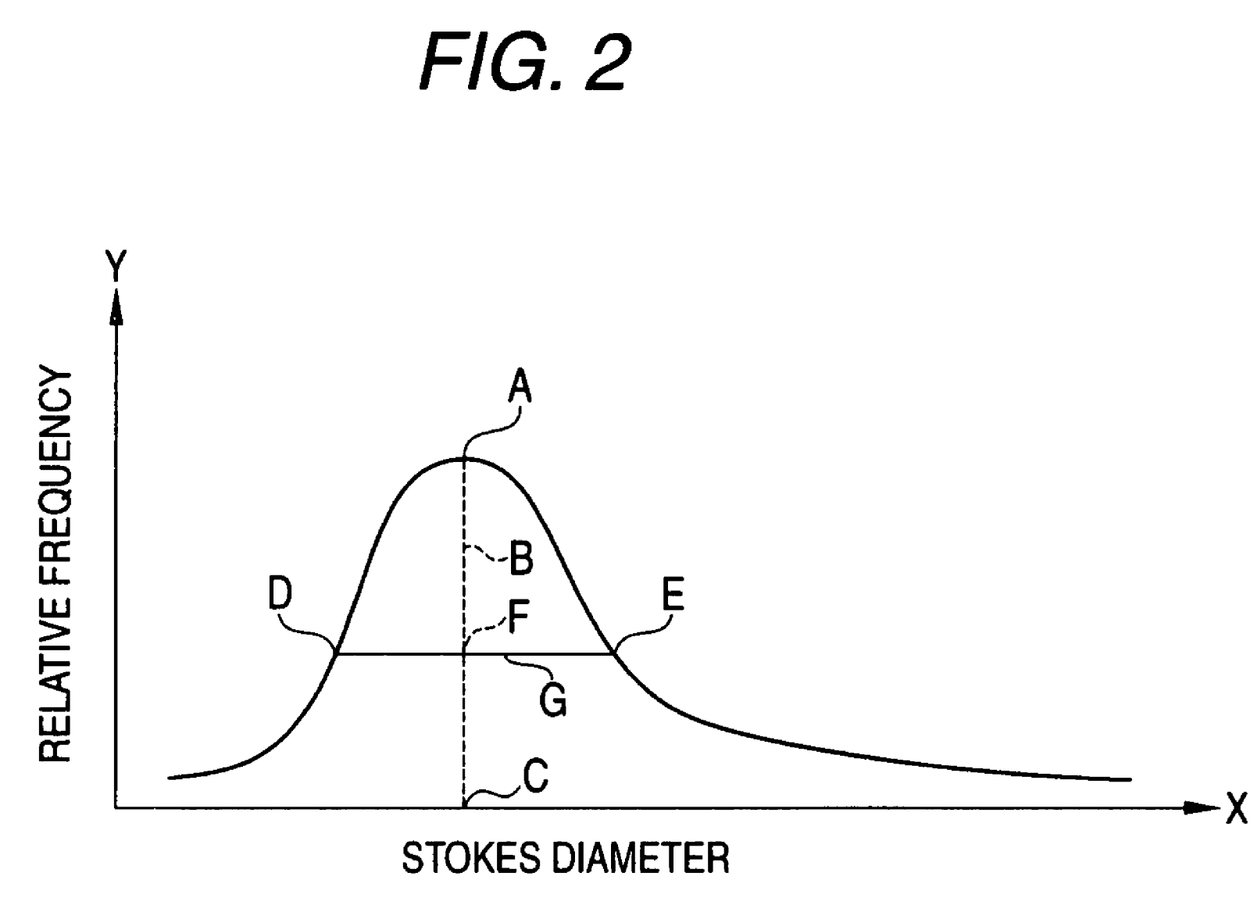
FIG. 2 is a presentation illustrating methods for determining a maximum-frequency Stokes equivalent diameter ($D_{mod}$) and a Stokes-equivalent-diameter half-value width ($D_{1/2}$)

Incidentally, in the invention, the $D_{mod}$, $D_{1/2}$, and $D_{75}$ were determined by the following methods. A carbon black sample which had been precisely weighed was added to a 20% aqueous ethanol solution containing a surfactant ("NONIDET P-40" manufactured by SIGMA CHEMICAL Corp.) to prepare a sample liquid having a carbon black concentration of 0.01% by weight. This sample liquid was treated for dispersion with an ultrasonic disperser ("Ultrasonic Generator USV-500V" manufactured by Ultrasonic Engineering Co., Ltd.) at a frequency of 200 kHz and an output of 100 W for 5 minutes to thereby prepare a carbon black slurry. On the other hand, 10 mL of a spin liquid (pure water) was injected into a particle size distribution analyzer of the centrifugal sedimentation type ("BI-DCP PARTICLSIZER" manufactured by BROOK HEVEN INSTRUMENTS CORP.). Thereinto was further injected 1 mL of a buffer liquid (20% aqueous ethanol solution). Thereafter, 1 mL of each carbon black slurry prepared above was injected and caused to undergo centrifugal sedimentation at a rotational speed of 10,000 rpm to thereby measure the Stokes equivalent diameters. A histogram showing the frequencies of occurrence corresponding to the Stokes equivalent diameters is drawn as shown in FIG. 2. The intersection of the X-axis of the histogram and the straight line which passes through the peak (A) of the histogram and is parallel to the Y-axis is referred to as C. The Stokes diameter at this point C was taken as the maximum-frequency Stokes equivalent diameter ($D_{mod}$). Furthermore, the midpoint in the segment AC is referred to as F, and the two intersections (D and E) of the histogram distribution curve and the straight line G which passes through F and is parallel to the X-axis were determined. The absolute value of the difference between the Stokes diameters respectively corresponding to D and E was taken as the Stokes-equivalent-diameter half-value width ($D_{1/2}$)

Figure 3:
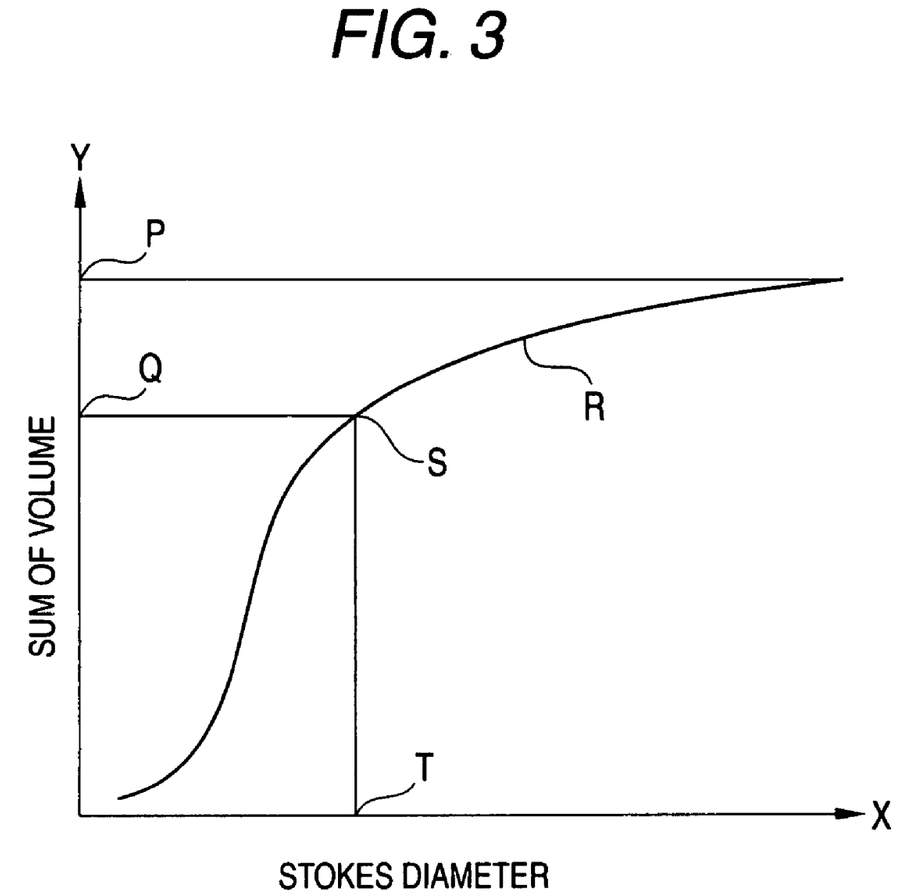
FIG. 3 is a presentation illustrating a method for determining a 75%-volume diameter ($D_{75}$)

The 75%-volume diameter ($D_{75}$) was determined from the histogram of FIG. 2 in the following manner. From each Stokes diameter and the frequency at this diameter, the volume of the aggregates having this Stokes diameter is determined. The relationship between each Stokes diameter and the corresponding accumulated volume, which is the total volume of all aggregates having a Stokes diameter not larger than that Stokes diameter, is calculated. This relationship is shown in FIG. 3 as curve R. In FIG. 3, P indicates the total volume of aggregates of all Stokes diameters. The point indicating 75% of this total volume is referred to as Q, and the intersection of curve R and the straight line which passes through Q and is parallel to the X-axis is referred to as S. The intersection of the X-axis and the straight line which passes through S and is parallel to the Y-axis is referred to as T. The value of this T was taken as 75%-volume diameter ($D_{75}$).

[TINT]

The carbon black of the invention is characterized in that the value of relative tinting strength (TINT), which is an index to the blackness thereof, is larger than 110%. In case where the value of this property is too small, the carbon black remaining on a material to be recorded after printing cannot sufficiently absorb light. Conversely, in case where the value thereof is too large, the carbon black tends to have a reduced average dispersed-particle diameter and, hence, the dispersed carbon black particles in the recording liquid are less apt to remain on a material to be recorded. There are hence cases where the resultant printed matter has a reduced blackness. Consequently, the TINT of the carbon black of the invention is higher than 110% and is preferably 120% or higher, especially 125% or higher. The TINT thereof is preferably 150% or lower, in particular 140% or lower, especially 135% or lower. The values of TINT in the invention were determined in accordance with JIS K6217 and the unit thereof is %.

TINT is considerably influenced by the primary-particle diameter of the carbon black. The smaller the primary-particle diameter (average particle diameter) of the carbon black to be used in the invention, the more the TINT is improved. Smaller primary-particle diameters are hence preferred. Consequently, the primary-particle diameter of the carbon black to be used in the invention is preferably 25 nm or smaller, in particular 20 nm or smaller. The primary-particle diameter of the carbon black in the invention was determined through examination with a transmission electron microscope. Specifically, a carbon black sample is first dispersed in chloroform for 10 minutes with an ultrasonic disperser at 150 kHz and 0.4 kW to prepare a dispersion sample. This sample is sprinkled over and fixed to a supporting film reinforced with carbon. A photograph of this film is taken with a transmission electron microscope (H7000, manufactured by Hitachi, Ltd.). An image thereof enlarged to a magnification of 100,000 diameters was examined with an Endter apparatus to measure the diameters of randomly selected, 1,000, primary carbon black particles. The arithmetic average of these was taken as the primary-particle diameter.

[$N_2$ SA]

The carbon black of the invention preferably has a nitrogen-adsorption specific surface area, represented by $N_2$ SA, in a specific range. When the value of this specific surface area is too small, there are cases where the carbon black has a small light absorption area and, hence, gives a printed matter having a reduced blackness. Conversely, too large values thereof tend to necessitate a large amount of a dispersant for dispersing the carbon black. There are hence cases where the recording liquid has an increased viscosity to cause printer nozzle clogging. Consequently, the $N_2$ SA of the carbon black of the invention is preferably 180 $m^2/g$ or larger, in particular 200 $m^2/g$ or larger, and is preferably 500 $m^2/g$ or smaller, in particular 450 $m^2/g$ or smaller, more preferably 400 $m^2/g$ or smaller, especially 350 $m^2/g$ or smaller. The values of $N_2$ SA in the invention were determined in accordance with JIS K6217 and the unit thereof is $m^2/g$.

[pH, Volatile Content, etc.]

The pH of the carbon black of the invention is preferably in a specific range. In case where the value of pH is too small, the following trouble arises. When this carbon black is dispersed in a dispersion medium, e.g., water, the resultant dispersion has a reduced pH and an anionic dispersant is less apt to dissociate into ions therein and hence comes to have the reduced ability to stabilize the dispersion. Conversely, in case where the pH thereof is too high, the dispersion has an excessively elevated pH and an anionic dispersant excessively dissociates into ions therein and comes to have enhanced water solubility, resulting in a reduced proportion of the dispersant adsorbed onto the carbon black. In either case, there is the possibility that the carbon black might aggregate during the storage of the recording liquid.

Consequently, the pH of the carbon black of the invention is preferably 5 or higher, in particular 6 or higher, especially 6.5 or higher, and is preferably lower than 10, in particular 9 or lower. In the invention, the pH of the carbon black was determined by the following method. Namely, 20 g of a carbon black sample is mixed with 200 cc of pure water, and this mixture is boiled for 15 minutes and then allowed to stand until it cools to room temperature. Subsequently, the supernatant is removed, and the pH of the residual carbon black/water slurry is measured with a pH meter employing a glass electrode.

The amount of surface functional groups in the carbon black of the invention preferably is in a specific range. This amount is expressed in terms of the amount of volatile matters. In case where the value of this amount is too large, the following trouble may arise. When this carbon black is dispersed in water, the surface of the carbon black repels the dispersant and prevents the dispersant from being adsorbed onto the carbon black surface. There is hence the possibility that the carbon black might aggregate during the storage of the recording liquid. Consequently, the volatile content of the carbon black of the invention is preferably 5% or lower, in particular 4% or lower.

In general, the ratio of volatile content to $N_2$ SA (volatile content/$N_2$ SA) represents the amount of functional groups per unit specific surface area of the carbon black and more essentially indicates interaction between the carbon black surface and a dispersant. When this ratio is too high, there are cases where the carbon black aggregates during the storage of the recording liquid. Consequently, the carbon black to be used in the invention preferably has a volatile content/$N_2$ SA ratio of 0.35 or lower, in particular 0.1 or lower, more preferably 0.09 or lower.

Incidentally, the volatile content of the carbon black of the invention was measured by the following method. Namely, a carbon black sample is dried at 105° C. for 1 hour and then cooled to room temperature. Subsequently, this carbon black dried is placed in a platinum crucible equipped with a lid of the putting-in type. This crucible is lidded and then placed for 7 minutes in an electric furnace kept at 950° C. The difference in weight between the carbon black before the placement in the electric furnace and the carbon black after the placement is divided by the weight of the carbon black before the placement in the electric furnace. This quotient is multiplied by 100, and the resultant value is taken as the volatile content. The unit thereof is %.

[Ash Content]

The ash content of the carbon black of the invention is preferably in a specific range. When the ash content thereof is too high, there are cases where the dispersion-stabilizing ability of the dispersant in the recording liquid is reduced and the carbon black aggregates during the storage of the recording liquid. Consequently, the ash content of the carbon black of the invention is preferably 0.1% or lower, especially 0.05% or lower. The ash content of the carbon black to be used in the invention was determined in accordance with JIS K6218 and the unit thereof is %.

Processes for producing the carbon black of the invention are not particularly limited. For example, the carbon black can be produced by the following process.

In general, furnace black is a carbon black which shows the properties specified in the invention, and is industrially produced by the oil furnace process. In the oil furnace process, a special reaction part lined with bricks capable of withstanding high temperatures of up to about 2,000° C. is used. A fuel, such as a gas or oil, and air are introduced into the reaction part to completely burn the fuel and thereby form a high-temperature atmosphere of 1,400° C. or higher. Thereafter, a liquid feedstock oil is continuously sprayed into the atmosphere and pyrolyzed. In a downstream region in the furnace, water is sprayed into a high-temperature gas containing the resultant carbon black to terminate the reaction. Thereafter, the reaction mixture is separated into the carbon black and a discharge gas with a bag filter. Although furnace black is generally obtained through the spraying of a feedstock oil, such as creosote oil, EHE, or tar, into a complete-combustion gas stream, the quality and properties thereof including secondary-particle pore structure and particle diameter are controlled by selecting various conditions such as the kind of the feedstock, flow rates of the fuel, air, and feedstock, kinds and amounts of additives to be added to the reaction system, such as an alkali metal salt, combustion conditions, and cooling rate.

Figure 1:
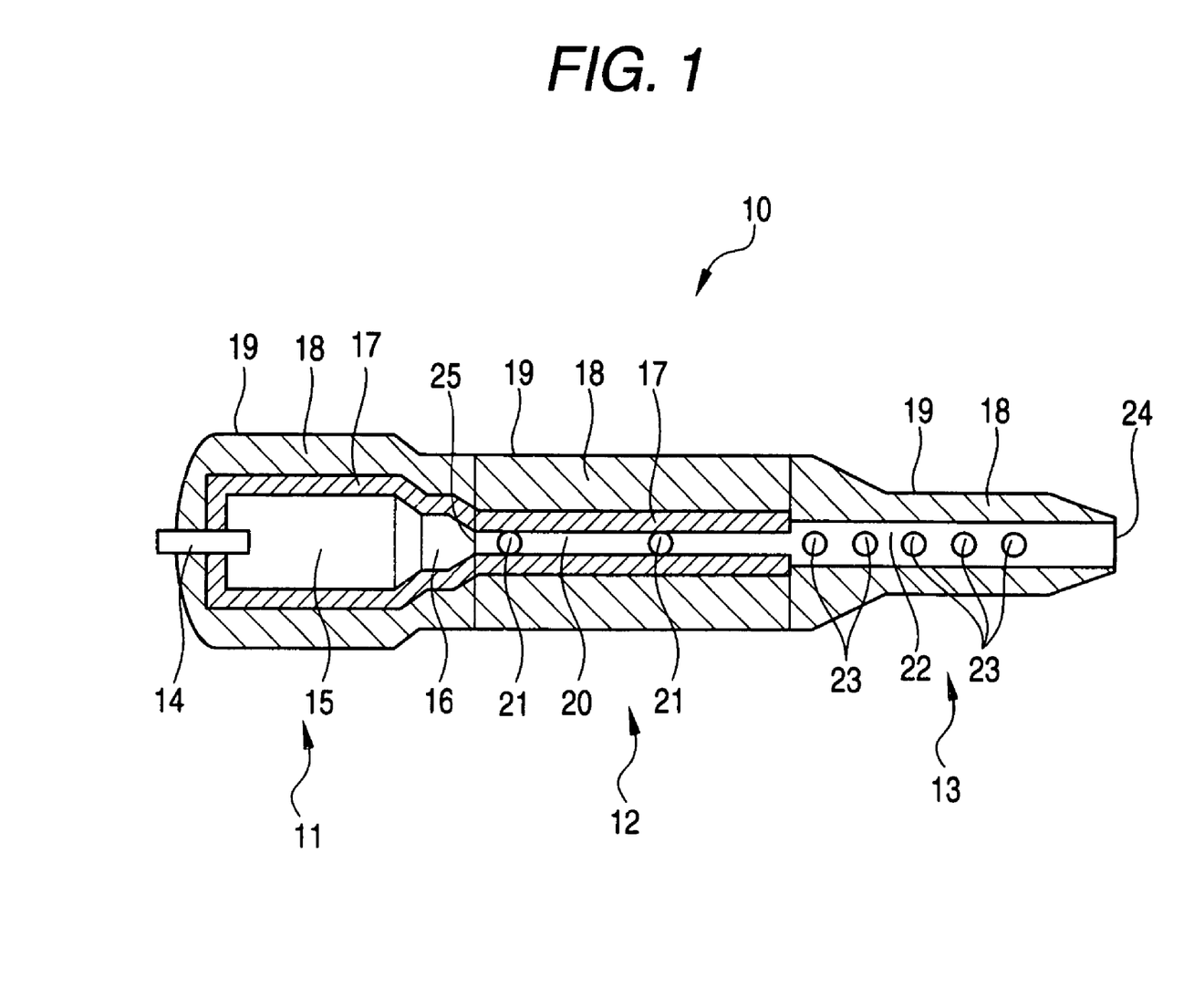
FIG. 1 is an overall diagrammatic sectional view of an apparatus for producing one embodiment of the carbon black according to the invention.

An example of apparatus for producing the carbon black of the invention is shown in FIG. 1, and details thereof are explained below.

As shown in FIG. 1, the apparatus 10 for producing the carbon black of the invention has: a first reaction zone 11 in which a high-temperature combustion gas stream is formed; a second reaction zone 12 which has been disposed downstream from the first reaction zone 11 and in which the high-temperature combustion gas stream introduced therein is mixed with a feedstock to yield a carbon black; and a third reaction zone 13 which has been disposed downstream from the second reaction zone 12 and in which the reaction for carbon black production is terminated.

These reaction zones are explained below in detail. The first reaction zone 11 has a combustion nozzle 14, a combustion chamber 15 in which a fuel and an oxygen-containing gas both supplied through the combustion nozzle 14 undergo combustion reaction, and an introduction part 16 through which a combustion gas stream formed by the combustion reaction is introduced into the second reaction zone 12. The inner wall of the combustion chamber 15 and introduction part 16 is constituted of a refractory 17 for high temperatures which is capable of withstanding high temperatures of 1,500° C. and higher. A general refractory 18 has been disposed outside the high-temperature refractory 17, and an iron shell 19 has been disposed outside the general refractory 18. As the fuel to be fed through the combustion nozzle 14 can generally be used hydrogen, carbon monoxide, natural gas, petroleum gas, a liquid petroleum fuel such as heavy oil, or a liquid coal fuel such as creosote oil. As the oxygen-containing gas can generally be used air, oxygen, or a mixture of these.

By employing such a constitution, a high-temperature combustion gas stream can be formed by fuel combustion and this gas stream can be introduced into the second reaction zone 12.

The second reaction zone 12 has a choke part 20 through which the combustion gas stream introduced through the introduction part 16 passes, and further has nozzles 21 for feeding a raw material for carbon black. The nozzles 21 have been disposed in different positions, e.g., two positions, in the choke part 20 along the axial direction for the choke part 20.

The choke part 20 is a part in which the sectional area decreases abruptly. The length thereof is desirably 800 mm or larger, preferably 900–3,000 mm. The area (inlet 25) from which this choke part 20 extends is an area which includes a narrowest part in the channel and in which the angle with the axial direction in which the channel becomes narrow changes from a value exceeding 5° to a value not larger than 5°. On the other hand, the end (outlet) of the choke part 20 is an area in which the angle with the axial direction in which the channel becomes wide exceeds 5°. The diameter of the choke part 20 is desirably 200 mm or smaller, preferably 30–200 mm, more preferably 50–150 mm. The inner wall of the choke part 20 is constituted of a refractory 17 for high temperatures which is capable of withstanding high temperatures of 1,500° C. and higher. A general refractory 18 has been disposed outside the high-temperature refractory 17, and an iron shell 19 has been disposed outside the general refractory 18.

The nozzles 21 have been disposed on the inner circumferential side of the choke part 20, for example, in respective positions which divide the circumference into three, four, six, or eight equal parts. This process for producing the carbon black of the invention is characterized in that the choke part, which has a small diameter, is disposed so as to be long as stated above, and preferably in that the nozzles 21 are disposed so as to divide the circumference. By employing such a constitution, a feedstock can be evenly fed to a combustion gas stream from directions perpendicular to the flow direction for the combustion gas stream without disturbing the combustion gas stream. Generally preferably used as the feedstock to be fed through the nozzles 21 are aromatic hydrocarbons such as benzene, toluene, xylene, naphthalene, and anthracene, coal-derived hydrocarbons such as creosote oil and carboxylic acid oil, petroleum-derived heavy oils such as ethylene heavy end oil and FCC oil, acetylenically unsaturated hydrocarbons, ethylenic hydrocarbons, aliphatic saturated hydrocarbons such as pentane and hexane, and the like.

In the case where nozzles 21 are disposed in the inner circumferential side of the choke part 20 along the axial direction therefor, the position of nozzles 21 on the most upstream side (first stage) is preferably in the range of up to 1 ms, based on the section-average flow rate of the combustion gas stream, from the inlet of the choke part 20. More preferably, the range is up to 0.6 ms. By introducing a feedstock at this position, a carbon black of the invention can be obtained which has a 24M4 DBP absorption of 100 cm$^3$/100 g or higher and a $D_{75}$ exceeding 45 nm and smaller than 120 nm and has a small particle diameter and evenness of aggregate diameter. On the other hand, second-stage nozzles 21 are disposed in an area outside the downstream side in the choke part 20 so that fresh primary carbon black particles can be formed during the period when the aggregates which have been formed from the feedstock fed through the first-stage nozzles 21 and are moving in the combustion gas stream retain surface activity and that the time required for these primary particles to fuse to and react with the aggregates (to yield carbon black) can be secured. The distance from these final nozzles to the outlet of the choke part 20 may be suitably determined according to feedstock spraying conditions, conditions for droplet shearing in the furnace, etc. Preferably, that distance is 300 mm or longer, especially 400 mm or longer.

By thus regulating the diameter of the choke part 20 to 200 mm or smaller, the flow rate of the combustion gas stream in the choke part 20 can be kept high and the function of turbulent mixing possessed by the combustion gas stream in the choke part 20 can be enhanced, whereby the atomization of the feedstock fed through the nozzles 21 can be accelerated. Furthermore, the thermal energy possessed by the combustion gas stream can be efficiently utilized for the reaction for carbon black production, whereby the rate of the carbon black production reaction can be improved. By regulating the length of the choke part 20 to 800 mm or longer, the atmosphere in the choke part 20 in which the carbon black production reaction takes place can be kept even and an even reaction field can be maintained. As a result, aggregates having an even size can be efficiently formed.

Since a feedstock is fed through the second-stage nozzles 21 during the period when the aggregates formed retain surface activity, the primary carbon black particles formed from the feedstock fed through the second-stage nozzles 21 can be fused to the aggregates without fail. As a result, the aggregates can be enlarged without fail.

The third reaction zone 13 has a cooling chamber 22 for lowering the temperature of the combustion gas stream introduced from the second reaction zone 12, and further has nozzles 23 which have been disposed in multistage arrangement in different positions along the axial direction for the cooling chamber 22 and which supply a coolant to the combustion gas stream. The inner wall of the cooling chamber 22 is constituted of a general refractory 18, and an iron shell 19 has been disposed outside the refractory 18. The nozzles 23 have been disposed on the inner circumferential side of the cooling chamber 22, for example, in respective positions which divide the circumference into three, four, six, or eight equal parts. By thus disposing the nozzles 23 so as to divide the circumference, a coolant can be evenly supplied to the combustion gas stream from directions perpendicular to the flow direction for the combustion gas stream. As the coolant to be supplied through the nozzles 23 can be used a liquid such as water or a non-oxidizing gas such as nitrogen gas.

By employing such a constitution, the temperature of the combustion gas stream introduced into the cooling chamber 22 can be rapidly lowered and can be finally reduced to 200–300° C. Consequently, the reaction for carbon black production can be rapidly terminated. The quenched combustion gas stream containing a carbon black is discharged from the carbon black production apparatus 10 through the outlet 24 of the third reaction zone and then treated with, e.g., a collecting bag filter not shown in the figure. The carbon black is thus separated from the gas and recovered.

A process for producing the carbon black of the invention (production conditions, etc.) will be explained below in detail.

A high-temperature combustion gas stream formed in the combustion chamber 15 of the first reaction zone 11 is introduced into the choke part 20 disposed in the second reaction zone 12. By regulating the diameter of the choke part 20 to 200 mm or smaller, the flow rate of the high-temperature combustion gas stream which has a low oxygen concentration and has been thus introduced into the choke part 20 can be heightened. Subsequently, a feedstock is blown into this combustion gas stream through the nozzles 21 disposed in different two or more positions (two positions in this embodiment) in the choke part 20 along the axial direction for the choke part 20. The feedstock fed through the nozzles 21 disposed on the upstream side in the choke part 20 absorbs the thermal energy possessed by the combustion gas and undergoes a series of changes, i.e., gasification, pyrolysis, vaporization, and condensation. The feedstock thus forms a precursor serving as nuclei and yields primary carbon black particles. Thereafter, the primary particles collide with one another to form aggregates. Furthermore, primary particles yielded from the feedstock fed through the nozzles 21 disposed on the downstream side fuse to the structures formed by the collisions to thereby increase the aggregate diameter. By regulating the length of the choke part 20 to 800 mm or longer, the reaction conditions for each of the generation of primary carbon black particles, formation of aggregates, and growth of the aggregates can be inhibited from fluctuating in this process in which a feedstock is fed in two stages.

In this operation, the proportion of the fuel to oxygen-containing gas supplied through the combustion nozzle 14 is regulated so that the oxygen concentration of the combustion gas stream in the choke part 20 becomes generally 10% by volume or lower, in particular 8% by volume or lower, especially 5% by volume or lower, particularly 3% by volume or lower. By regulating the oxygen concentration in the combustion gas stream in the choke part 20 to such a low level, the feedstock supplied is less apt to burn and the temperature in the choke part 20 can be kept even. As a result, the feedstock supplied evenly undergoes the series of changes, i.e., gasification, pyrolysis, vaporization, and condensation, and a precursor serving as nuclei is evenly formed to thereby evenly yield primary particles.

Furthermore, the temperature of the combustion gas stream introduced into the choke part 20 is regulated to 1,500° C. or higher, preferably 1,700–2,400° C. This regulation can be attained, for example, by adding oxygen to the air to be used for combustion in forming a combustion gas stream in the first reaction zone 11. Techniques for elevating the temperature of the combustion gas stream are not limited to the addition of oxygen, and use may be made of, e.g., a method in which the air is preheated. Incidentally, to burn the fuel in such a manner that the oxygen concentration of the combustion gas stream in the choke part 20 becomes generally 10% by volume or lower, preferably 8% by volume or lower, more preferably 5% by volume or lower, even more preferably 3% by volume or lower, increases the proportion of resultant $CO_2$ to enable the combustion reaction to generate a larger amount of heat and thereby contributes to an increase in the temperature of the combustion gas stream. By regulating the temperature of the combustion gas stream in the choke part 20 to 1,500° C. or higher, the rates of the series of changes of the feedstock supplied, i.e., gasification, pyrolysis, vaporization, and condensation, are improved and the rate of formation of a precursor serving as nuclei and the rate of generation of primary particles can be improved.

Furthermore, by regulating the temperature of the combustion gas stream to 1,500° C. or higher and introducing this combustion gas stream from the combustion chamber 15 through the introduction part 16 into the choke part 20 having a diameter of 200 mm or smaller, preferably 30–200 mm, more preferably 50–150 mm, the flow rate of the combustion gas stream in the choke part 20 is regulated to 250 m/s or higher, preferably 500–1,000 m/s. By this constitution, the feedstock sprayed into the combustion gas stream through the nozzles 21 can be effectively atomized and more evenly mixed with the combustion gas stream. As a result, the rates of the series of changes of the feedstock supplied, i.e., gasification, pyrolysis, vaporization, and condensation, are improved and the rate of formation of a precursor serving as nuclei and the rate of generation of primary particles can be improved.

By thus regulating the oxygen concentration, temperature, and flow rate of the combustion gas stream in the choke part 20, the series of changes of the feedstock supplied through the nozzles 21 disposed on the upstream side in the choke part 20, i.e., gasification, pyrolysis, vaporization, and condensation, can be evenly conducted at a high rate and many nuclei can be formed to yield many primary particles. As a result, small primary particles are yielded. Although the primary particles yielded fuse to one another through mutual collisions and thus form aggregates, the high temperature enables the primary particles to collide with one another at a high frequency and, hence, many aggregates are rapidly formed. Because of this, the aggregates obtained have a small diameter and a narrow aggregate diameter distribution.

Subsequently, a feedstock is fed through the downstream-side nozzles 21 during the period when the aggregates formed from the feedstock fed through the upstream-side nozzles 21 retain surface activity. As a result, the feedstock supplied becomes many primary carbon black particles due to the thermal energy transferred from the combustion gas stream. While moving in the choke part, these primary particles formed undergo collisions with themselves and collisions against the aggregates formed from the feedstock fed in the first stage. However, the frequency of collisions of the primary particles against the aggregates is higher than the frequency of collisions of the primary particle with themselves. Because of this, the aggregates, while moving in the combustion gas stream, gradually increase in diameter since the primary particles which have collided against the aggregates are fused to the surface thereof. Since the primary particles which have collided against the aggregates are fused thereto to gradually increase the aggregate diameter, the frequency of collisions of primary particles against such aggregates increases more and more. The growth of the existing aggregates predominates over the formation of fresh aggregates. Consequently, aggregates having a narrow aggregate particle diameter distribution are formed.

The high-temperature high-velocity combustion gas stream containing carbon black aggregates formed during passage through the choke part 20 is discharged through the outlet of the choke part 20 into the cooling chamber 22. Since the diameter of the cooling chamber 22 is larger than the diameter of the choke part 20, the flow rate of the combustion gas stream decreases. Furthermore, nozzles 23 for spraying, e.g., water have been disposed in multistage arrangement on the inner circumferential side of the cooling chamber 22, for example, in positions which divide the circumference into four, six, or eight equal parts. Water is sprayed through these nozzles 23 from directions perpendicular to the flow direction for the combustion gas stream, whereby the temperature of the combustion gas stream is rapidly lowered to rapidly terminate the reaction for carbon black production. The temperature of the combustion gas stream is finally reduced to 200–300° C. As a result, the carbon black aggregates contained in the combustion gas stream come to be contained in a stream of a mixed-gas comprising the steam formed from the water sprayed for cooling and the combustion gas. The carbon black aggregates together with the mixed gas are discharged from the carbon black production apparatus 10 through the outlet 24 of the third reaction zone 13 and separated from the mixed gas with, e.g., a collecting bag filter not shown in the figure. The carbon black aggregates are thus recovered.

The carbon black to be used in the recording liquid of the invention may be the carbon black described above or may be one obtained by chemically treating (oxidation treatment, fluorination treatment, etc.) the carbon black, one obtained by physically or chemically bonding a dispersant, surfactant, resin, or the like thereto (e.g., one which has undergone grafting treatment or one onto which a dispersant has been adsorbed before dispersing the carbon black), etc.

In order for a dispersion of the carbon black in a dispersion medium to give a printed matter having improved frictional resistance, this recording liquid preferably contains a resin. Although the resin to be incorporated may be either a water-soluble resin or an emulsion, it is preferred that the recording liquid should contain a water-soluble resin. Such a water-soluble resin may be either an ionic water-soluble resin or a nonionic water-soluble resin. However, an ionic water-soluble resin is preferred. Although the ionic water-soluble resin may be any of an anionic water-soluble resin, cationic water-soluble resin, and amphoteric water-soluble resin, it preferably is an anionic water-soluble resin. One resin only may be used or a combination of some of these may be used.

From the standpoint of the storage stability of the recording liquid, the anionic water-soluble polymer preferably is one which, in its free acid form, has an acid value of generally 40 mgKOH/g or higher, preferably 50 mgKOH/g or higher, more preferably 100 mgKOH/g or higher, even more preferably 150 mgKOH/g or higher. In case where the acid value thereof is lower than 40 mgKOH/g or lower, the electrostatic repulsion attributable to functional groups of the resin adsorbed to the pigment becomes low and, hence, dispersing properties and dispersion stability become poor. Furthermore, a copolymer having hydrophobic groups is preferred from the standpoints of the dispersion stability of the carbon black and the water resistance and frictional resistance of printed matters.

Examples of the hydrophobic groups of the polymer include organic groups having an aromatic ring, such as an optionally substituted phenyl, benzyl, or naphthyl group, and optionally branched or substituted alkyl, alkenyl, alkynyl, and cycloalkyl groups having 4 or more carbon atoms. Preferred of these are organic groups having an aromatic ring.

Examples of the anionic water-soluble polymer to be used in the invention include (α-methyl)styrene/maleic acid copolymers, (α-methyl)styrene/(meth)acrylic acid copolymers, (α-methyl) styrene/(meth)acrylic ester/(meth)acrylic acid copolymers, (meth)acrylic ester/(meth)acrylic acid copolymers, (meth)acrylic ester/maleic acid copolymers, and/or salts of these polymers. Preferred are α-methyl)styrene/(meth)acrylic acid copolymers. The term α-methyl)styrene herein means α-methylstyrene and/or styrene, and the term (meth)acrylic acid means methacrylic acid and/or acrylic acid. The anionic water-soluble polymer may be any of a block copolymer, graft copolymer, and random copolymer. However, mainly from the standpoint of production cost, a graft polymer or a random polymer is preferred and, in particular, a random polymer is preferred. The weight-average molecular weight thereof is preferably 50,000 or lower, more preferably 15,000 or lower, especially preferably 10,000 or lower, from the standpoint of ejection stability. Higher molecular weights result in an increased viscosity and poor ejection stability. This copolymer can be used in the form of a salt with an alkali metal such as lithium, sodium, or potassium, a salt with ammonia or an organic amine such as dimethylamine or (mono, di, or tri)ethanolamine, or the like. Examples of commercial products of the polymers described above or of solutions of the polymers include "Joncryl 67""679", "680", "682", "683", and "690", all manufactured by Johnson Polymer Corp., and/or salts of these, and further include "Joncryl 52", "57", "60", "62", "63", "70", "354", "501", and "6610", all manufactured by Johnson Polymer Corp.

As the medium of the recording liquid of the invention is generally used an aqueous medium consisting mainly of water. In this case, it is preferred to use water to which at least one water-soluble organic solvent has been added.

Examples of the water-soluble organic solvent are roughly divided into ones which function as a humectant and ones which function as a penetrating solvent.

Examples of the former include ethylene glycol, propylene glycol, 1,3-propanediol, diethylene glycol, triethylene glycol, polyethylene glycols (e.g., "#200", "#300", "#400", "#4000", and "#6000", manufactured by Woko Pure Chemical Industries, Ltd.), glycerol, 2-pyrrolidone, N-methyl-2-pyrrolidone, 1,3-dimethylimidazolinone, thiodiglycols, sulfolane, dimethyl sulfoxide, neopentyl alcohol, trimethylolpropane, and 2,2-dimethylpropanol.

Examples of the penetrating solvents (penetration aids) include ethylene glycol monomethyl ether, ethylene glycol dimethyl ether, ethylene glycol monoethyl ether, ethylene glycol diethyl ether, ethylene glycol mono-n-propyl ether, ethylene glycol monoisopropyl ether, ethylene glycol mono-n-butyl ether, ethylene glycol mono-sec-butyl ether, ethylene glycol monoisobutyl ether, ethylene glycol mono-tert-butyl ether, ethylene glycol mono-n-amyl ether, ethylene glycol mono-n-hexyl ether, propylene glycol monomethyl ether, propylene glycol dimethyl ether, propylene glycol monoethyl ether, propylene glycol diethyl ether, propylene glycol mono-n-propyl ether, propylene glycol monoisopropyl ether, propylene glycol mono-n-butyl ether, propylene glycol mono-sec-butyl ether, propylene glycol monoisobutyl ether, propylene glycol mono-tert-butyl ether, diethylene glycol monomethyl ether, diethylene glycol dimethyl ether, diethylene glycol monoethyl ether, diethylene glycol mono-n-propyl ether, diethylene glycol monoisopropyl ether, diethylene glycol mono-n-butyl ether, diethylene glycol mono-sec-butyl ether, diethylene glycol monoisobutyl ether, diethylene glycol mono-tert-butyl ether, dipropylene glycol monomethyl ether, dipropylene glycol monoethyl ether, dipropylene glycol mono-n-propyl ether, triethylene glycol mono-n-butyl ether, polyethylene glycol monopropyl ether, polyethylene glycol monobutyl ether, and ethylene glycol adducts of glycerol (e.g., Liponic EG-1 (manufactured by Lipo Chemicals Inc.)). These organic solvents may be used alone or in combination of two or more thereof.

Various surfactants can be used in the recording liquid according to the invention in order to enhance the penetrativity of the recording liquid. Examples thereof include various anionic surfactants, nonionic surfactants, cationic surfactants, and amphoteric surfactants.

Examples of the nonionic surfactants include fatty acid salts, alkylsulfuric acid ester salts, alkylbenzenesulfonic acid salts, alkylnaphthalenesulfonic acid salts, alkylsulfosuccinic acid salts, alkyl(diphenyl ether)disulfonic acid salts, alkylphosphoric acid salts, polyoxyethylene alkylsulfuric acid ester salts, polyoxyethylene alkylarylsulfuric acid ester salts, alkanesulfonic acid salts, naphthalenesulfonic acid/formalin condensates, polyoxyethylene alkylphosphoric acid esters, N-methyl-N-oleoyltauric acid salts, and α-olefinsulfonic acid salts.

The nonionic surfactants are not particularly limited. However, ones having an ethylene oxide structure or propylene oxide structure are preferred from the standpoints of storage stability and print color density. Of these, ones having an HLB of 9–17, especially 10–16, are more preferred. Specific examples of the nonionic surfactants include polyoxyethylene nonylphenyl ether, polyoxyethylene octylphenyl ether, polyoxyethylene alkyl ethers, polyoxyethylene lauryl ether, polyoxyethylene oleyl ether, polyoxyethylene tridecyl ether, polyoxyethylene cetyl ether, polyoxyethylene stearyl ether, polyoxyethylene alkylamines, aminopolyoxyethylene, sorbitan fatty acid esters, polyoxyethylene sorbitan laurate, polyoxyethylene sorbitan palmitate, polyoxyethylene sorbitan stearate, polyoxyethylene sorbitan oleate, naphthol/ethylene oxide adducts, acetylene glycol/ethylene oxide adducts, bisphenol A/ethylene oxide adducts, oxyethylene/oxypropylene block polymers, sorbitan fatty acid esters, polyoxyethylene sorbitan fatty acid esters, polyoxyethylene sorbitol fatty acid esters, glycerol fatty acid esters, polyoxyethylene fatty acid esters, polyoxyethylene alkylamines, and α-olefinsulfonic acid salts. Commercial products of nonionic surfactants may be used, and examples thereof include Surfynol 440, Surfynol 465, and Surfynol 485 (all manufactured by Air Products Inc.) and Acetylenol EH and Acetylenol EL (both manufactured by Kawaken Fine Chemicals Co., Ltd.).

On the other hand, examples of the cationic surfactants and amphoteric surfactants include alkylamine salts, quaternary ammonium salts, alkyl betaines, and aminoxides.

The amount of a low-molecular nonionic surfactant to be used is generally 0.1–3 parts by weight, preferably 0.5–1 part by weight, per 100 parts by weight of the recording liquid. The surface tension of the recording liquid is suitably regulated by changing the kind and amount of the low-molecular nonionic surfactant to be used. However, the surface tension of the recording liquid of the invention is preferably 25 dyne/cm or higher and 54 dyne/cm or lower. In case where the surface tension thereof exceeds 54 dyne/cm, the recording liquid, when printed, shows slower penetration into the material to be recorded, resulting in a trouble that the printing speed should be reduced. On the other hand, in case where the surface tension of the recording liquid is lower than 25 dyne/cm, the recording liquid shows excessive penetration into materials to be recorded, resulting in an impaired print color density.

Examples of the composition of the recording liquid are as follows. A surfactant having an acetylene bond can be incorporated to obtain an ink composition required to have excellent stability in continuous ejection and penetrativity into recording media, as described in, e.g., JP-A-2001-302,950. A propylene oxide adduct of a lower alcohol may also be added to this ink composition. Furthermore, the specific compound having an acetylene bond described in JP-A-2000-3760, 1,5-pentanediol, and a butyl ether solvent may be incorporated.

Moreover, the recording liquid may be formulated so as to contain an acetylene glycol type surfactant and/or polysiloxane type surfactant and an organic solvent comprising an alkyl ether derivative of a polyhydric alcohol in which the alkyl has 3 or more (preferably 3 to 6) carbon atoms and/or a 1,2-alkanediol, whereby a satisfactory ink composition having excellent color reproducibility, high penetrativity, and a short drying time is obtained as described in JP-A-2000-30237.

Besides the ingredients described above, a fungicide, bactericide, pH regulator, urea, and other ingredients may be added to the recording liquid of the invention according to need. Preferred examples of, in particular, pH regulators, dissolution aids, and antioxidants include alkanolamines such as diethanolamine and triethanolamine.

Processes for producing the recording liquid of the invention are not particularly limited. However, general processes are: a method which comprises dispersing the pigment in a medium in the presence of a necessary one of the aforementioned water-soluble resins and necessary ones of the aforementioned additive ingredients in a known manner to obtain a dispersion having a high concentration and then further adding a resin, necessary ones of the aforementioned additive ingredients, and a medium to regulate the concentration and thereby prepare a recording liquid (master batch method); and a method which comprises dispersing the pigment in a medium in the presence of any of the aforementioned resin ingredients and necessary ones of the aforementioned additive ingredients to prepare a recording liquid. The master batch method is advantageous because the dispersion treatment can be conducted in a high concentration and the method is efficient from the standpoint of regulation to a desired dispersed-particle diameter.

Examples of dispersers usable for the dispersion treatment include dispersers employing a medium and medium-less dispersers. The dispersers employing a medium include a ball mill, sand mill, Dyno Mill, DCP mill, and the like. The medium-less dispersers include a roll mill, ultrasonic disperser, and the like. Any of these and other known dispersers may be used.

It is preferred in the invention that after the grinding/dispersion treatment with a disperser, coarse particles be removed with a filter or centrifugal separator.

The amount of the black pigment to be used, which comprises the carbon black, is desirably 0.1% by weight or larger, in particular 3% by weight or larger, based on the whole weight of the recording liquid, and is desirably 15% by weight or smaller, preferably 13% by weight or smaller, more preferably 10% by weight or smaller, based on the whole recording liquid. Amounts thereof smaller than 0.1% by weight result in impaired coloration, while amounts thereof larger than 15% by weight result in a high viscosity. The amount of the resin to be used is preferably 0–200 parts by weight on a solid basis per 100 parts by weight of the pigment.

The pigment, resin, additive, and organic solvent each may consist of one ingredient only. However, each of these may comprise a combination of two or more ingredients according to circumstances so as to further improve properties.

The average dispersed-particle diameter D50 of the pigment in the recording liquid is preferably 150 nm or larger, in particular 170 nm or larger, more preferably 180 nm or larger, and is preferably 300 nm or smaller, in particular 250 nm or smaller, more preferably 220 nm or smaller, from the standpoints of dispersion stability, ejection stability, and print quality.

Besides being used for ink-jet recording and writing utensils, the recording liquid of the invention can be used as a recording liquid for other applications. The recording liquid of the invention is suitable especially for ink-jet recording, i.e., for use in the method in which an ink is ejected from an ink-jet nozzle to conduct printing on a material to be recorded.

The material to be recorded to which the recording liquid of the invention is to be applied may be any desired one. Examples thereof include plain paper of a single-layer structure comprising, e.g., cellulose, a filler, and a sizing agent and special papers of a multilayer structure comprising a base and an ink-receiving layer formed on at least one side of the base. The recording liquid of the invention can be applied to all materials to be recorded (plain paper, recycled paper, special papers for ink-jet recording (e.g., coated paper and glossy paper), special films for ink-jet recording (e.g., coated films and glossy films), OHP films, and others). However, the effects of the recording liquid are significant when it is printed especially on materials to be recorded which have a porous surface, e.g., paper.

According to the invention, a pigment dispersion type recording liquid can be provided which gives a printed matter having satisfactory printed-image quality with a high blackness and diminished blurring and further having satisfactory fastness such as light resistance and water resistance and which has a low viscosity, satisfactory suitability for ejection, and satisfactory storage stability. The carbon black of the invention can be used in recording liquids, in particular, recording liquids for ink-jet printers or the like.

EXAMPLES

The invention will be explained below in more detail by reference to Examples, but the invention should not be construed as being limited to the following Examples unless the invention departs from the spirit thereof.

<Production of Carbon Blacks>

Carbon blacks 1 to 4, 6, and 7 were produced under the respective sets of conditions shown in Table 1 using the production apparatus 10 shown in FIG. 1 which comprised a first reaction zone 11 having a combustion chamber 15 having an inner diameter of 500 mm and a length of 1,500 mm and equipped with a combustion nozzle 14, a second reaction zone 12 connected to the first reaction zone 11 and having a choke part 20 having an inner diameter of 50 mm and a length of 1,400 mm and equipped with a plurality of feedstock supply nozzles 21 penetrating through the circumferential wall, and a third reaction zone 13 connected to the second reaction zone 12 and having a cooling chamber 22 having an inner diameter of 200 mm and a length of 1,500 mm and equipped with a plurality of water supply nozzles 23 penetrating through the circumferential wall, and in which the feedstock supply nozzles on the most upstream side were located at a distance of 200 mm from the inlet 25 of the choke part 20. Natural gas and creosote oil were used as a fuel and a feedstock hydrocarbon, respectively. Properties of the carbon blacks obtained are shown in Table 2.

Figure 4:
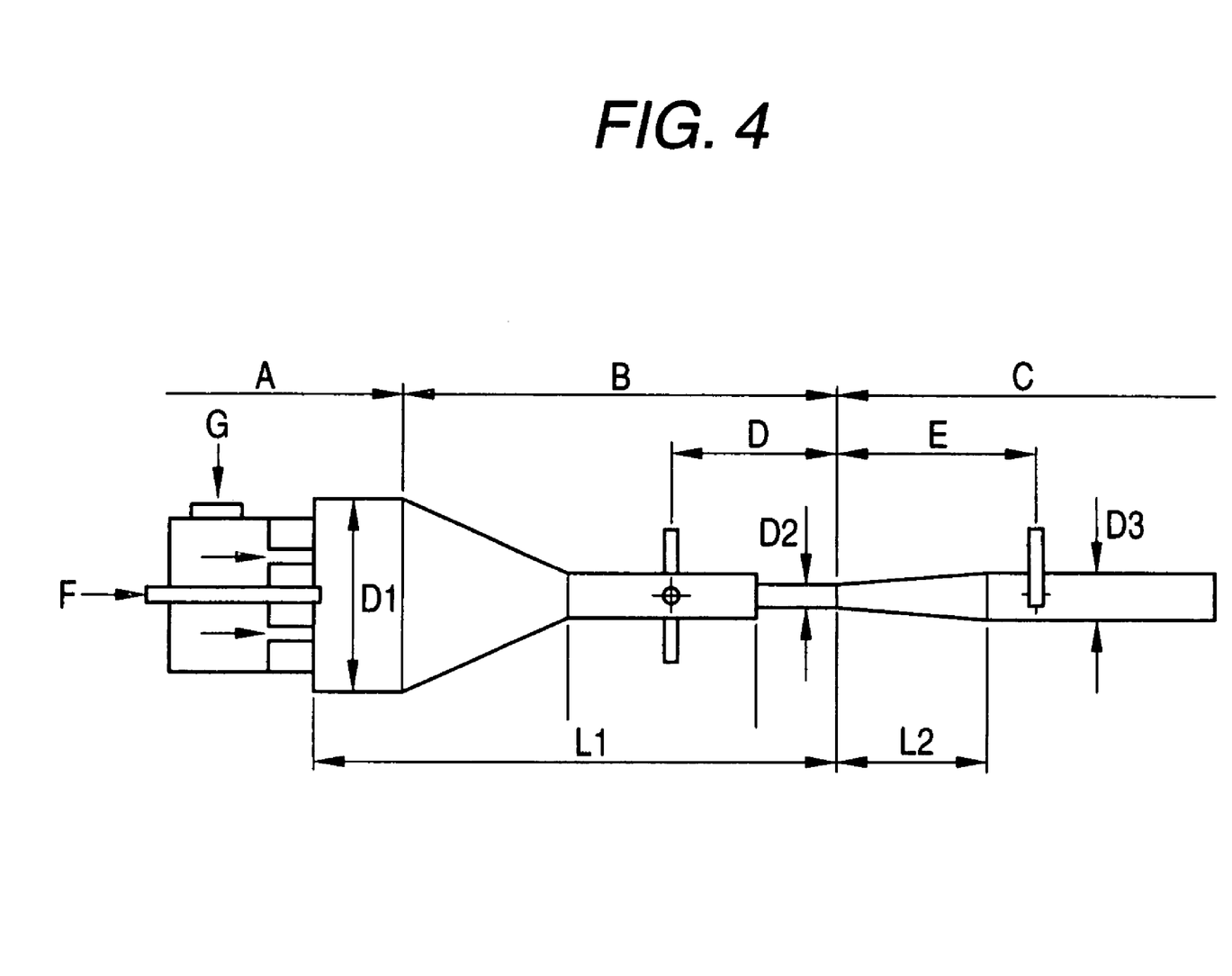
FIG. 4 is an overall diagrammatic sectional view of an apparatus for producing the carbon black of a Comparative Example.

Carbon black 5 was produced with the production apparatus shown in FIG. 4 under the conditions shown in Table 1. This apparatus is an apparatus for producing a carbon black by the oil furnace process. It comprises a first zone A in which a fuel is burned to generate a high-temperature gas, a second zone B which has been connected to the first zone A on its downstream side and into which a feedstock is introduced, and a third zone C which has been connected to the second zone B on its downstream side and in which the carbon black yielded is quenched by water spraying.

First, heavy oil as a fuel is introduced in an atomized state through a fuel introduction nozzle F. This fuel is mixed with air for combustion introduced through a combustion air introduction nozzle G and is burned. Besides being heavy oil, the fuel to be used here can be a liquid fuel such as gas oil, gasoline, or kerosene or a gaseous fuel such as nature gas, propane, or hydrogen. The combustion chamber of this apparatus has a diameter (D1) of 1,100 mm. The combustion gas generated is passed through a tapered device gradually decreasing in diameter. This zone has been designed so that the flow rate of the gas in the furnace thus increases to thereby elevate the turbulent energy in the furnace.

In the second zone B, a feedstock as a raw material for carbon black is introduced through six feedstock introduction pipes disposed in the position (feedstock introduction position) located upstream, at a distance D, from the downstream-side end of the choke part having the smallest diameter in this apparatus (the diameter (D2) of this part is 175 mm) (i.e., from the boundary between the second zone B and the third zone C). Although the feedstock to be thus introduced generally is a coal-derived hydrocarbon such as creosote oil or a petroleum-derived hydrocarbon such as ethylene bottom oil, creosote oil was used here. By changing the feedstock introduction position and regulating the feedstock amount, the particle diameter (primary-particle diameter) and the degree of the linking of particles (secondary-particle structure) can be regulated. The distance (L1) between the end of the combustion chamber and the downstream-side end of the choke part is 3,300 mm.

In the third zone C, the choke part is connected through a tapered part to a tubular part for reaction termination. Water is introduced and sprayed through a cooling water introduction pipe disposed in the position (reaction termination position) located downstream, at a distance E, from the downstream-side end of the choke part, in the tubular part for reaction termination. The combustion gas is thus quenched to thereby terminate the reaction for carbon black production. The length (L2) of the tapered part is 1,800 mm and the diameter (D3) of the tubular part for reaction termination is 400 mm. The third zone C is connected on its downstream side to a collecting device such as a bag filter or cyclone, where the gas is separated from the carbon black. Properties of the carbon black obtained are shown in Table 2.

TABLE 1

|  | Carbon black 1 | Carbon black 2 | Carbon black 3 | Carbon black 4 | Carbon black 5 | Carbon black 6 | Carbon black 7 |
| --- | --- | --- | --- | --- | --- | --- | --- |
| Kind of fuel | natural gas | natural gas | natural gas | natural gas | heavy oil C | natural gas | natural gas |
| Fuel amount (gas, [Nm$^3$/h]; heavy oil, [kg/h]) | 57 | 57 | 57 | 57 | 314 | 57 | 57 |
| Air amount [Nm$^3$/h] | 465 | 462 | 465 | 465 | 5800 | 465 | 465 |
| Oxygen amount [Nm$^3$/h] | 35 | 43 | 35 | 35 | 0 | 35 | 35 |
| Kind of secondary-structure regulator | KOH | KOH | KOH | KOH | K$_2$CO$_3$ | KOH | KOH |
| Number of feedstock introduction stages | 2 | 2 | 2 | 1 | 1 | 2 | 1 |
| Upstream-side feedstock amount [kg/h] | 40 | 54 | 41 | 77 | 850 | 36 | 67 |
| Upstream-side secondary-structure regulator amount [kg/h] | 0 | 0 | 7.5 × 10$^{-5}$ | 0 | 0.15 | 0 | 0 |
| Upstream-side introduction position (distance from choke outlet) [mm] | 1200 | 1200 | 1200 | 945 | 1744 | 1200 | 945 |
| Downstream-side feedstock amount [kg/h] | 33 | 36 | 33 | — | — | 30 | — |
| Downstream-side secondary-structure regulator amount [kg/h] | 0 | 0 | 6.1 × 10$^{-5}$ | — | — | 0 | — |
| Downstream-side introduction position (distance from choke outlet) [mm] | 500 | 500 | 500 | — | — | 500 | — |
| Amount of water for reaction termination [kg/h] | 150 | 150 | 150 | 150 | 1800 | 100 | 150 |
| Reaction termination position (distance from choke outlet) [mm] | 1190 | 910 | 1190 | 910 | 1600 | 630 | 270 |

TABLE 2

|  | Unit | Carbon black 1 | Carbon black 2 | Carbon black 3 | Carbon black 4 | Carbon black 5 | Valcan XC-72R | Carbon black 6 | Carbon black 7 |
| --- | --- | --- | --- | --- | --- | --- | --- | --- | --- |
| N$_2$ SA | m$^2$/g | 338 | 204 | 312 | 318 | 286 | 256 | 325 | 265 |
| DBP absorption | cm$^3$/100 g | 180 | 202 | 154 | 145 | 155 | 166 | 192 | 141 |
| 24M4 DBP absorption | cm$^3$/100 g | 112 | 120 | 111 | 99 | 111 | 119 | 124 | 92 |
| pH | — | 7 | 7.1 | 7.6 | 7 | 6.1 | 6.1 | 6.34 | 6.7 |
| Volatile content | % | 2.23 | 1.78 | 1.39 | 2.21 | 1.66 | 1.27 | 2.42 | 1.48 |
| Ash content | % | 0.01 | 0.03 | 0.01 | 0.02 | 0.07 | 0.12 | 0.01 | 0.03 |
| TINT | % | 128 | 120 | 129 | 138 | 107 | 85 | 129 | 146 |
| D$_{mod}$ | nm | 61 | 81 | 58 | 54 | 74 | 165 | 70 | 50 |
| D$_{1/2}$ | nm | 43 | 54 | 42 | 31 | 137 | 163 | 45 | 30 |
| D$_{75}$ | nm | 89 | 109 | 74 | 74 | 165 | 557 | 83 | 60 |
| D$_{1/2}$/D$_{mod}$ | — | 0.7 | 0.67 | 0.72 | 0.57 | 1.85 | 0.87 | 0.64 | 0.6 |
| 24M4 DBP absorption/D$_{mod}$ | cm$^3$/100 g nm | 1.84 | 1.48 | 1.91 | 1.83 | 1.5 | 0.64 | 1.77 | 1.84 |
| (DBP absorption) − (24M4 DBP absorption) | cm$^3$/100 g | 68 | 82 | 43 | 46 | 44 | 47 | 68 | 49 |
| Volatile content/N$_2$ SA | mg/m$^2$ | 0.066 | 0.087 | 0.045 | 0.07 | 0.058 | 0.05 | 0.074 | 0.056 |
| Primary-particle diameter | nm | 15 | 18 | 16 | 15 | 19 | 29 | 15 | 15 |

Example 1

Preparation of Recording Liquid

The ingredients shown in Table 3 were put in a vessel made of stainless steel and subjected to a 3-hour pulverization treatment with a sand grinder together with 205.8 parts of zirconia beads having an average diameter of 0.5 mm. The resultant liquid was diluted with 24.6 parts of ion-exchanged water, 10.8 parts of glycerol, and 2.8 parts of isopropyl alcohol with stirring. Thereafter, the mixture was subjected to pressure filtration through a No. 5C filter paper to obtain a recording liquid.

TABLE 3

| Ingredient | Proportion (parts by weight) |
|---|---|
| 25% by weight aqueous solution of potassium salt of styrene/acrylic acid polymer ("Joncryl 679" manufactured by Johnson Polymer Corp. (acid value, 215 mgKOH/g; Mw = 8,500)) | 3.3 |
| Ion-exchanged water | 88.2 |
| Glycerol | 3 |
| Carbon black 1 | 5.5 |
| Total | 100 |

(Measurement of Dispersed-Particle Diameter)

The recording liquid was diluted with ion-exchanged water and then examined for dispersed-particle diameter distribution with a particle size distribution analyzer ("Microtrac UPA 150" manufactured by Nikkiso Co., Ltd.). The value of D50 in the particle diameter distribution (D50 indicates that 50% of the particles each have a size not larger than this particle diameter) was taken as the average dispersed-particle diameter. The results of the measurement are shown in Table 4.

(Print Color Density Test)

The recording liquid obtained in Example 1 was thinly applied to an electrophotographic paper (Xerox 4024 Paper, manufactured by Xerox Corp.) with a bar coater No. 7. After 24-hour drying, the coated paper obtained was examined for black density (OD) with a Macbeth densitometer (RD 914). The results of the measurement are shown in Table 4.

Example 2

A recording liquid was prepared and evaluated in the same manner as in Example 1, except that the carbon black 1 in Example 1 was replaced by carbon black 2. The results of the measurements are shown in Table 4.

Example 3

A recording liquid was prepared and evaluated in the same manner as in Example 1, except that the carbon black 1 in Example 1 was replaced by carbon black 3. The results of the measurements are shown in Table 4.

Comparative Example 1

A recording liquid was prepared and evaluated in the same manner as in Example 1, except that the carbon black 1 in Example 1 was replaced by carbon black 4. The results of the measurements are shown in Table 4.

Comparative Example 2

A recording liquid was prepared and evaluated in the same manner as in Example 1, except that the carbon black 1 in Example 1 was replaced by Vulcan XC-72R, manufactured by Cabot Corp. The results of the measurements are shown in Table 4.

TABLE 4

| | Unit | Example 1 | Example 2 | Example 3 | Comparative Example 1 | Comparative Example 2 |
|---|---|---|---|---|---|---|
| Carbon black | — | carbon black 1 | carbon black 2 | carbon black 3 | carbon black 4 | Vulcan XC-72R |
| TINT | % | 128 | 120 | 129 | 138 | 85 |
| 24M4 DBP absorption | $cm^3/100\ g$ | 112 | 120 | 111 | 99 | 119 |
| $D_{75}$ | nm | 89 | 109 | 74 | 74 | 557 |
| Dispersed-particle diameter | nm | 202 | 219 | 206 | 202 | 307 |
| OD | — | 1.56 | 1.59 | 1.55 | 1.52 | 1.45 |

As Table 4 shows, the recording liquids of the invention give a printed matter having a high blackness without having an increased dispersed-particle diameter, especially due to the use of the carbon blacks of the invention (carbon blacks 1 to 3). It is obvious that since these recording liquids thus have a small dispersed-particle diameter, they have excellent storage stability.

Example 4

Preparation of Recording Liquid

The ingredients shown in Table 5 were put in a vessel made of stainless steel and subjected to a 3-hour pulverization treatment with a sand grinder together with 286.5 parts of zirconia beads having an average diameter of 0.5 mm. The resultant liquid was diluted with 65.3 parts of ion-exchanged water, 9.6 parts of glycerol, 3.8 parts of isopropyl alcohol, and 13.5 parts of 2-pyrrolidone with stirring. Thereafter, the mixture was subjected to pressure filtration through a No. 5C filter paper to obtain a recording liquid.

TABLE 5

| Ingredient | Proportion (parts by weight) |
|---|---|
| 25% by weight aqueous solution of potassium salt of styrene/acrylic acid polymer ("Joncryl 679" manufactured by Johnson Polymer Corp. (acid value, 215 mgKOH/g; Mw = 8,500)) | 3.8 |
| Ion-exchanged water | 84.3 |
| Glycerol | 4.2 |
| Carbon black 1 | 7.7 |
| Total | 100 |

(Measurement of Dispersed-Particle Diameter)

Measurement was made in the same manner as in Example 1. The results thereof are shown in Table 6.

(Viscosity Measurement)

The viscosity of the recording liquid was measured at 25° C. with an E-type viscometer. The results of the measurement are shown in Table 6.

(Printing Test)

The recording liquid was subjected to solid printing on wood-free plain paper for ink-jet inks (KA4250NP) manufactured by Seiko Epson Corp. and on PM matte paper for exclusive use with ink-jet inks (KA450PM) manufactured by Seiko Epson Corp., using ink-jet printer DJ 970 Cxi, manufactured by Hewlett-Packard Co., in the normal mode. The printed matters were visually examined for scratchiness. After 24-hour drying, each of the solid prints obtained was examined for density (OD) with a Macbeth densitometer (RD 914). The results of the measurement are shown in Table 6.

Example 5

A recording liquid was prepared and evaluated in the same manner as in Example 4, except that the carbon black 1 in Example 4 was replaced by carbon black 6. The results of the measurements are shown in Table 6.

Comparative Example 3

A recording liquid was prepared and evaluated in the same manner as in Example 4, except that the carbon black 1 in Example 4 was replaced by carbon black 4. The results of the measurements are shown in Table 6.

Comparative Example 4

A recording liquid was prepared and evaluated in the same manner as in Example 4, except that the carbon black 1 in Example 4 was replaced by carbon black 5. The results of the measurements are shown in Table 6.

Comparative Example 5

A recording liquid was prepared and evaluated in the same manner as in Example 4, except that the carbon black 1 in Example 4 was replaced by carbon black 7. The results of the measurements are shown in Table 6.

TABLE 6

| | Unit | Example 4 | Example 5 | Comparative Example 3 | Comparative Example 4 | Comparative Example 5 |
|---|---|---|---|---|---|---|
| Carbon black | — | carbon black 1 | carbon black 6 | carbon black 4 | carbon black 5 | carbon black 7 |
| TINT | % | 128 | 129 | 138 | 107 | 146 |
| 24M4 DBP absorption | cm³/100 g | 112 | 124 | 99 | 111 | 92 |
| $D_{75}$ | nm | 89 | 83 | 74 | 165 | 60 |
| Dispersed-particle diameter | nm | 170 | 150 | 135.1 | 169.1 | 131 |
| Viscosity of recording liquid | cP | 2.22 | 2.33 | 2.23 | 2.77 | 2.23 |
| Print scratchiness | — | not occurred | not occurred | not occurred | occurred | not occurred |
| OD (wood-free plain paper) | — | 1.68 | 1.69 | 1.66 | 1.57 | 1.6 |
| OD (PM matte paper) | — | 1.78 | 1.79 | 1.76 | 1.7 | 1.74 |

It is obvious that the recording liquids of the invention can have a reduced viscosity without having an increased dispersed-particle diameter and give excellent printed matters having a high blackness and free from defects such as "scratchiness", especially due to the use of the carbon black of the invention (carbon black 1 or 6).

While the invention has been described in detail and with reference to specific embodiments thereof, it will be apparent to one skilled in the art that various changes and modifications can be made therein without departing from the spirit and scope thereof.

This application is based on a Japanese patent application filed on Sep. 26, 2003 (Application No. 2003-335965), the contents thereof being herein incorporated by reference.

INDUSTRIAL APPLICABILITY

When used in printing especially on materials to be recorded which have a porous surface, such as paper, the recording liquid of the invention gives a printed matter having satisfactory printed-image quality with a high blackness and diminished blurring and further having satisfactory fastness of a record such as light resistance and water resistance. The recording liquid provided by the invention further has a low viscosity and satisfactory suitability for ejection. Furthermore, the carbon black of the invention is an excellent black pigment for use in such recording liquids which simultaneously satisfies various properties including satisfactory dispersibility and ejection stability in the recording liquids and the property of giving a printed matter having a high blackness.

The invention claimed is:

1. A carbon black having the following features (a) to (c):
   (a) a 24M4 DBP absorption of 100 cm$^3$/100 g or higher,
   (b) a $D_{75}$ between 45 nm and 120 nm, and
   (c) a TINT exceeding 110%.

2. The carbon black as claimed in claim 1, wherein the carbon black has the further following feature (d):
   (d) a $D_{1/2}/D_{mod}$ of 0.7 or lower.

3. A recording liquid comprising the carbon black as claimed in claim 1.

4. A recording liquid comprising the carbon black as claimed in claim 2.

5. The recording liquid as claimed in claim 3, wherein the carbon black further has a dispersed-particle diameter D50 of from 150 nm to 300 nm.

6. A method of printing on a porous material comprising printing the recording liquid as claimed in claim 3, on the porous material.

7. The recording liquid as claimed in claim 4, wherein the carbon black further has a dispersed-particle diameter D50 of from 150 nm to 300 nm.

8. A method of printing on a porous material comprising printing the recording liquid as claimed in claim 4 on the porous material.

9. A method of printing on a porous material comprising printing the recording liquid as claimed in claim 5 on the porous material.

10. A method of printing on a porous material comprising printing the recording liquid as claimed in claim 7 on the porous material.

11. The method according to claim 6, wherein the porous material is paper.

12. The method according to claim 8, wherein the porous material is paper.

13. The method according to claim 9, wherein the porous material is paper.

14. The method according to claim 10, wherein the porous material is paper.

* * * * *